June 21, 1960  F. M. LONG  2,941,554
ELECTRIC HAND SAW MITERING GUIDE
Filed May 1, 1957  2 Sheets-Sheet 1
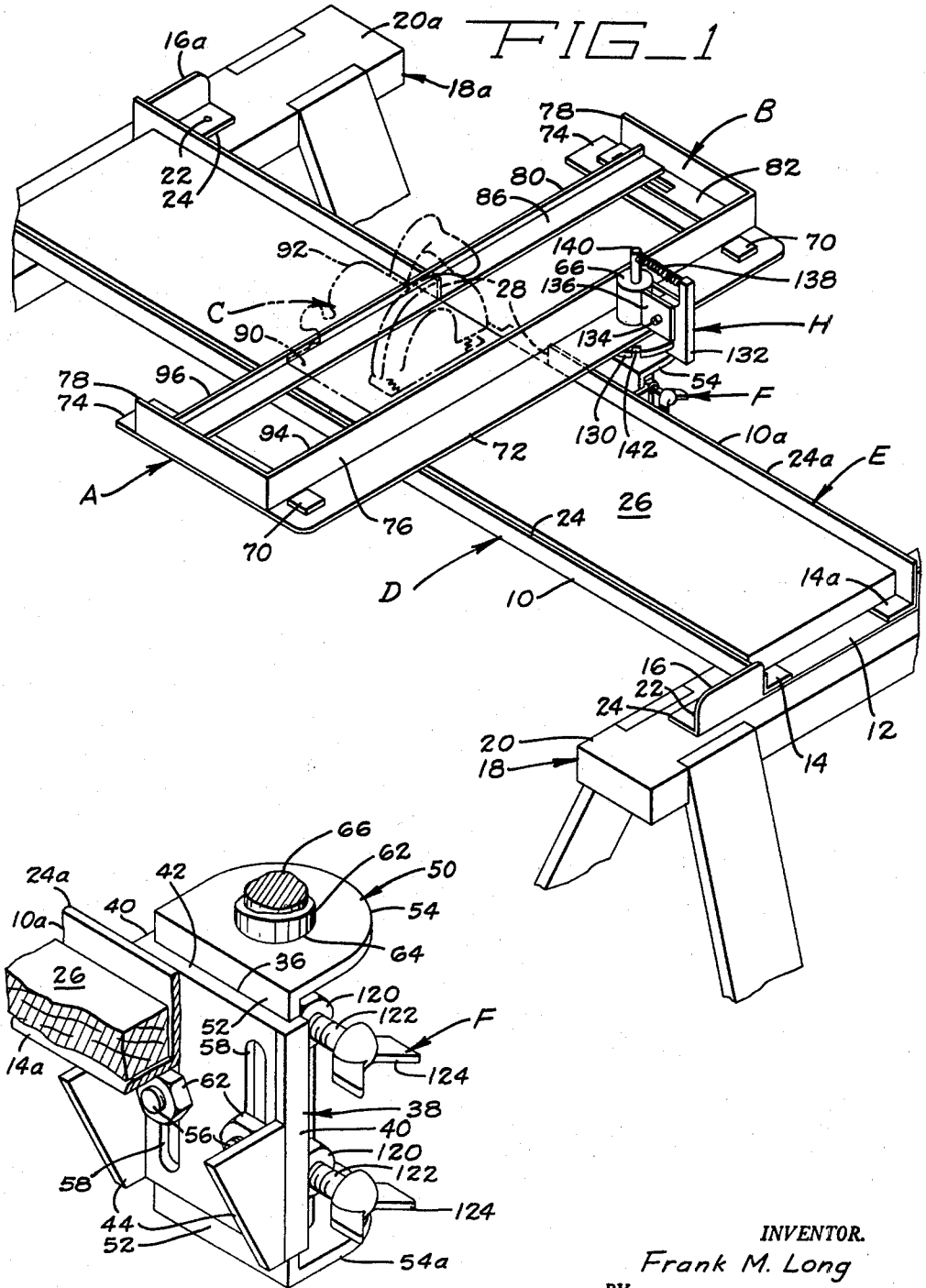
FIG_1
FIG_5
INVENTOR.
Frank M. Long
BY
Attorney

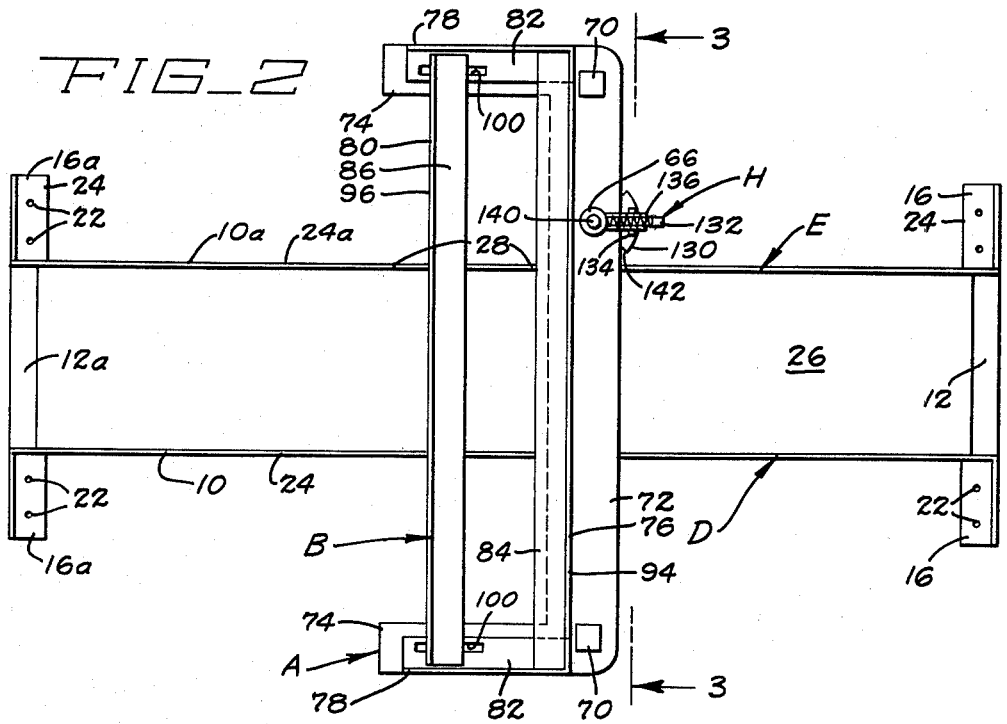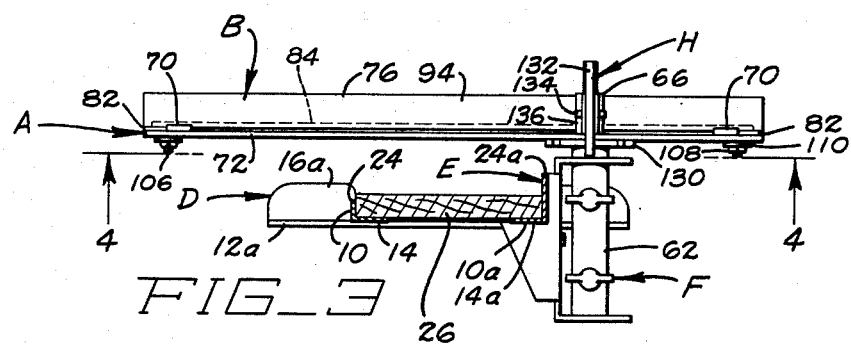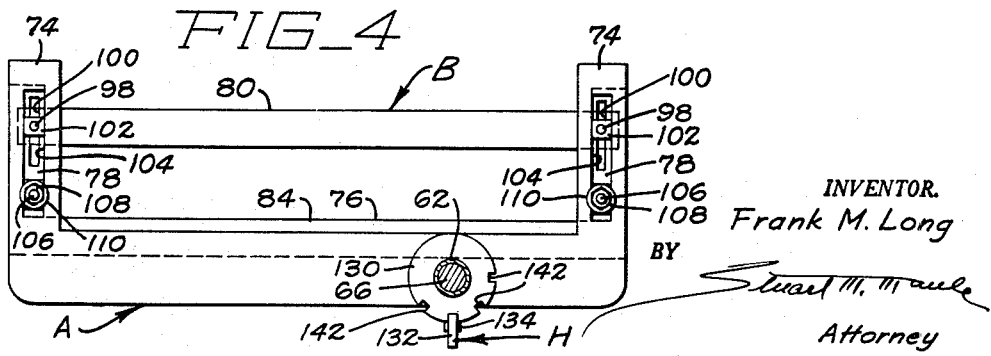

United States Patent Office 2,941,554
Patented June 21, 1960

2,941,554
ELECTRIC HAND SAW MITERING GUIDE
Frank M. Long, 3230 Maplethorp Lane, Soquel, Calif.
Filed May 1, 1957, Ser. No. 656,328
2 Claims. (Cl. 143—6)

This invention relates to wood sawing apparatus, and more particularly to apparatus for guiding a saw in making mitre cuts.

An object of the invention is to provide an improved apparatus for guiding a saw in making mitre cuts.

Another object is to provide apparatus for guiding an electric hand saw in making cuts according to a predetermined plan.

Another object is to provide an electric hand saw guide adaptable for either ripping or cross cutting at any of a variety of angular cuts.

Another object of the invention is to provide an electric hand saw guide provided with an automatic stop mechanism for releasably locking the guide in position making mitre cuts in a board or other work piece at any selected one of a plurality of commonly required, or standard angularities.

Another object is to provide a mitre-cutting guide of the character described which is adapted for use in connection with any of several different sizes of electric hand saw, both with respect to the diameter of the circular saw blade thereof and with respect to the width of the base plate through which the blade projects.

The invention possesses other objects and advantageous features, some of which, with those enumerated, will be set forth in the following description of a particular embodiment of the invention chosen for illustration and description and illustration herein with the understanding that the invention is adaptable for embodiment in other specific forms without departing from the spirit or scope of the invention as defined by the subjoined claims.

Referring to the drawings:

Figure 1 is a perspective, partly broken away, of an electric hand saw mitering guide embodying the principles of the present invention.

Figure 2 is a top plan, partly broken away, of the saw guide of Fig. 1.

Figure 3 is a transverse, vertical sectional view, the plane of section being indicated by the line 3—3 of Fig. 2, with the direction of view as indicated by the arrows.

Figure 4 is a horizontal section taken along the line 4—4 of Fig. 3 and looking upward, as indicated by the arrows.

Figure 5 (Sheet 1) is an enlarged detail view in perspective of. the vertically adjustable pivotal support that constitutes one of the structural features of the present invention.

Briefly described, the electric hand saw guide of the present invention includes a frame A having a channel guide B thereon for the slidable support for a conventional electric hand saw. The channel guide B permits reciprocatory movement of the saw C thereon and restricts the same to rectilinear movement in a direction parallel to the plane of its circular saw blade as is necessary for proper manipulation of the saw C in practical operation thereof. The saw guiding frame A is pivotally mounted for rotational adjustment in a horizontal plane above a base D adapted to support a board or other work piece to be sawed. A stop flange E rigid with and upstanding from the base D serves as an abutment against which the work piece can conveniently be engaged to locate the same accurately in longitudinal alignment with the base D and thereby assure proper positioning of the work piece on the base D. The pivotal mounting of the frame A permits adjustment thereof so that the plane in which the blade of the saw C operates and moves is a plane of any desired angularity with respect to the work piece, and releasable means F are provided for locking the frame in selected position so that mitre cuts of a certain degree can be duplicated with a high degree of exactitude. Moreover, a latch mechanism H is provided to aid in locating the frame in any of several positions for making certain standard, or commonly employed, mitre cuts, such as at angles of 30°, 45°, 60°, and 90° with the longitudinal dimension of the work piece on the base D and properly engaged with the stop flange E.

In the embodiment of the invention chosen for illustration and description herein, the base D is of elongate form and is fabricated from two angle bars 10 and 10a rigidly retained in spaced, parallel relation by end plates 12 and 12a (Figs. 1 and 2) welded to the under sides of the horizontal flanges 14 and 14a of the angle bars 10 and 10a, respectively. Preferably, short pieces 16 and 16a of angle bar stock are welded to each end of the base D projecting to either side thereof, to increase the lateral dimension of its supporting structure and thereby impart additional stability thereto. Thus, the mitering guide of the invention is adapted to be mounted in operative position by resting the base D upon two spaced-apart sawhorses 18 and 18a (Fig. 1) with the laterally projecting pieces 16 and 16a serving as feet resting upon the horizontal top bars 20 and 20a of the horses 18 and 18a, respectively. Holes 22 may be provided in the horizontal bottom flanges 24 of the pieces 16 and 16a to receive nails (not shown) or other fasteners if it is desired to thus insure against accidental displacement of the base D from the supporting sawhorses 18 and 18a.

The longitudinally extending angle bars 10 and 10a of the base D are arranged with their horizontal flanges 14 and 14a, respectively, projecting inward, i.e., toward each other, from their vertical flanges 24 and 24a, respectively. Therefore, the base D is adapted to receive a plank 26, which preferably is dimensioned to fit between the vertical flanges 24 and 24a and to rest upon the horizontally aligned bottom flanges 14 and 14a. The plank 26 serves as a table to support on its upper surface the board or other work piece to be mitered.

As is clearly shown in Figs. 1 and 3, the vertical flange 24 terminates below the plane of the upper surface of the plank. This enables the plank to provide support for a board or other work piece (hereinafter called a "board") of greater width than the plank 26. Thus, the saw guide of the present invention is adapted for use in performing mitre cuts in wide boards, such as sheets of plywood of any desired width, limited only by the length of the saw-carrying frame A and the guiding channel B.

The other vertical flange 24a, however, is of sufficient vertical extent to project above the plane of the upper surface of the board, and thus to provide the stop flange E whereby a board resting upon the plank 26 can be accurately aligned longitudinally with the base D by engaging one longitudinal edge of the board against the part of the flange 24a that is upstanding from the horizontal plane of the upper face of the plank 26. A relatively wide notch 28 (Fig. 1) is formed in at least the upper part of the flange 24a to provide clearance for the blade of a saw being used to make a cut transversely of a board supported on the plank 26 and having one edge abutting against the stop flange E.

The means for pivotally mounting the saw-guiding frame A upon the base D is best illustrated in Fig. 5. It comprises a guideway 36 defined by a strip 38 of channel-shaped cross section secured to the vertical flange 24a of the angle bar 10a with its side flanges 40 projecting away from the angle bar 10a so that the guideway 36 defined thereby is provided by the side of the strip 38 that faces away from the base D. The strip is welded to the angle bar 10a so that the outer face of its web 42 and the inner faces of the flanges 40 are perpendicular to the plane of the upper surface of the plank 26. Gusset plates 44 are welded to the lower part of the channel strip 38 and project therefrom in position for their upper edges to engage the under surface of the horizontal flange 14a of the angle bar 10a, to which both gusset plates 44 are welded, to strengthen the mounting of the channel strip 38 upon the base D.

A bracket 50 vertically slidable within the guideway 36 comprises a vertical plate 52 and a flange 54, 54a projecting horizontally from each end. Two spaced studs 56 rigid with the plate 52 project through vertical slots 58 in the web 42 of the channel strips 28 and carry nuts 62 whereby the bracket 52 may be locked in selected position of vertical adjustment with relation to the base D.

A vertical bearing tube 62 (Figs. 3 and 5) is welded to the two flanges 54 and 54a of the bracket 50, with the upper end of the tube 62 extending through a hole 64 in the upper flange 54 so that a pintle pin 66 can be journalled in the bearing tube 62. The lower end of the pintle pin 66 rests upon the upper face of the lower flange 54a, thus determining the height of the saw-carrying frame A, which is welded to the pintle pin 66 adjacent one lateral edge of the frame A.

The frame A is flat on its upper surface save for a stop 70 adjacent each end of the frame substantially in longitudinal alignment with the pintle pin 66. The frame A comprises a longitudinal plate or strip 72 and an arm 74 projecting laterally from each end of the strip 72. The saw-guiding channel B is laterally slidable on the frame A and includes a longitudinal angle bar 76, an arm 78 of angle section projecting laterally from each end thereof, and a laterally adjustable angle bar 80 resting upon the upper faces of the horizontal flanges 82 of the arms 78. It is to be noted in Fig. 3 that the horizontal flanges 82 of the arms 78 are below the plane of the horizontal flange 84 of the longitudinal angle bar 76 so that even though the adjustable angle bar 80 rests upon the upper surfaces of the flanges 82, the horizontal flanges 84 and 86 (Fig. 2) of the longitudinal bars 76 and 80, respectively, are in horizontal alignment. These horizontally aligned flanges 84 and 86 provide sliding support for the bed plate 90 (Fig. 1) of an electric hand saw 92, while the vertical flanges 94 and 96 of the bars 76 and 80, respectively, provide guides for the saw 92 by confining the bed plate 90 between themselves. Since the longitudinal bar 80 is laterally adjustable toward and away from the bar 76, electric hand saws having bed plates 90 of various widths can be accommodated on the saw-guiding channel B.

The longitudinal bar 80 is adapted to be secured to the arms 78 of the saw-guiding channel B by studs 98 (Fig. 4) welded to the bar 80 and projecting downward therefrom through slots 100 which extend longitudinally of the arms 78. Nuts 102 threaded onto the lower ends of the studs 98 may be tightened against the under surface of the arms 78 to lock the longitudinal bar 80 in selected position of lateral adjustment with respect to the other members of the saw-guiding channel B. Since the guiding channel B rests upon the upper surface of the frame A, the nuts 102 are slidably engaged within slots 104 in the arms 74 of the frame A. The bar 80 should be secured to the arms 78 in selected spacing from the bar 76 by tightening the nuts 102 on their studs 98 while the channel B is removed from the frame A. The slots 104 likewise slidably receive studs 106 welded to and projecting downward from the under surfaces of the arms 78 of the saw-guiding channel B, to receive nuts 108 and washers 110 engaging the under surfaces of the arms 74 of the frame A whereby the entire saw-guiding channel B may be releasably secured to the frame A in selected position of lateral adjustment thereupon.

Thus, it may be seen that the saw-guiding channel B is adapted to receive and slidably support any of various types of electric hand saws thereupon and to guide the same for vertical rectilinear movement longitudinally thereof. By turning the frame A to a position wherein it extends perpendicularly across the base D, as illustrated in Figs. 1 and 2, a board resting upon the plank 26 and having one longitudinal edge abutting against the stop flange E, the plate 90 of the saw 92 can be caused to cut the board at right angles to the said edge thereof. The frame A can be turned about the axis of the pintle pin 66 so that it extends at any desired angularity with respect to the base D, so that the board can be cut at any desired mitre angle. The bearing tube 62 has a pair of vertically spaced bosses 120 (Fig. 5) formed thereon. Each of these bosses is threaded and adapted to receive a set screw 122 preferably having a wing-head 124 thereon so that the set screws 122 can be tightened against the pintle pin 66 and thus releasably clamp the frame A in any selected position of angular adjustment relative to the base D and the stop flange E thereof. This permits mitre cuts of any selected angularity to be duplicated exactly as many times as may be desired.

The latch mechanism H to which reference has been made hereinabove provides convenient means for automatically setting the frame A in any of several positions wherein the saw supported thereby will make mitre cuts of standard, or frequently used, angularity. This latch means H comprises a disc 130 (Figs. 1 and 3) welded to the upper end of the bearing tube 62 in position for a pawl 132 carried by the frame A to engage the peripheral edge of the disc 130, as best shown in Fig. 1. The pawl 132 is carried by a pin 134 extending between the legs of a U-shaped bracket 136 projecting radially from the upper end of the pintle pin 66 above the frame A. A coil spring 138 under compression between the upper end of the pawl 132 and a pin 140 projecting rigidly upward from the upper end of the pintle 66 urges the lower end of the pawl 132 inward against the edge of the disc 130 so that the pawl will enter one of a plurality of notches 142 that are provided in the edge of the disc, and thus releasably lock the frame A in the position of angularity with respect to the base D that is determined by the circumferential position of the selected notch 142 in the edge of the disc 130. The notches 142 with which the disc 130 is provided, as illustrated in Fig. 4, will serve to locate the frame A when positioned perpendicularly with respect to the base D, as illustrated in Figs. 1, 2, and 3, or swung to positions at 45° angularity to either side of the said perpendicular position. An additional notch 142 is provided within which the pawl 132 becomes engaged when the frame A is swung 90° from its position illustrated in Fig. 1 and in a counter-clockwise direction as viewed from above. When in this position, the frame A is disposed with its longitudinal axis parallel to that of the base D and since the pintle pin 66 is adjacent one side of the frame A, the frame A projects therefrom to a position above the base D. Consequently, the frame A is adapted to guide the saw in ripping a board suitably positioned upon the base D.

The vertical adjustment of the bracket 50 which is attained by loosening the nuts 60 permits the frame A to be raised or lowered to accommodate electric hand saws whose circular saw blades are of various diameters.

Having thus described my invention, that which is believed to be new and for which protection by Letters Patent is desired, is:

1. An electric hand saw guide comprising a base for supporting in a substantially horizontal plane a board to be sawed, a substantially vertically extending guideway of channel-shaped cross-section secured to a side edge of said base, a bracket comprising a vertical plate slidably mounted in said guideway and vertically spaced flanges rigid with and projecting horizontally from the vertical plate, releasable means for rigidly securing the bracket to said guideway in selected position of vertical adjustment relative to the base, a vertical bearing tube rigid with said flanges, a pintle pin journaled in said bearing tube and projecting above the plane of the uppermost of said flanges, the lower end of the pintle pin bearing upon the lowermost of the flanges, and a saw-carrying frame rigid with and projecting laterally from the part of said pintle pin that projects above said uppermost flange.

2. An electric hand saw guide comprising a base for supporting in a substantially horizontal plane a board to be sawed, a substantially vertically extending guideway of channel-shaped cross-section secured to a side edge of said base, a bracket comprising a vertical plate slidably mounted in said guideway and vertically spaced flanges rigid with and projecting horizontally from the vertical plate, releasable means for rigidly securing the bracket to said guideway in selected position of vertical adjustment relative to the base, a vertical bearing tube rigid with said flanges, a pintle pin journaled in said bearing tube and projecting above the plane of the uppermost of said flanges, the lower end of the pintle pin bearing upon the lowermost of the flanges, and a saw-carrying frame rigid with and projecting laterally from the part of said pintle pin that projects above said uppermost flange, said saw-carrying frame including a longitudinally extending plate and an arm projecting laterally from each end of the plate, a saw-guiding channel mounted on said frame for sliding movement thereon toward and away from the axis of said pintle pin, and releasable means for securing said channel to said frame in selected spacing from said axis.

References Cited in the file of this patent

UNITED STATES PATENTS

| | | |
|---|---|---|
| 1,208,150 | Hall | Dec. 12, 1916 |
| 2,513,497 | Laughlin | July 4, 1950 |
| 2,627,287 | McCluskey | Feb. 3, 1953 |
| 2,630,146 | Van Tuyl | Mar. 3, 1953 |
| 2,651,333 | Spinney | Sept. 8, 1953 |
| 2,656,860 | Thayer | Oct. 27, 1953 |
| 2,714,903 | Miller | Aug. 9, 1955 |
| 2,739,624 | Haddock | Mar. 27, 1956 |
| 2,765,820 | Perkins | Oct. 9, 1956 |
| 2,789,594 | Coleman | Apr. 23, 1957 |
| 2,803,271 | Shaw | Aug. 20, 1957 |